US009430337B1

United States Patent
Gupta et al.

(10) Patent No.: US 9,430,337 B1
(45) Date of Patent: Aug. 30, 2016

(54) DISASTER RECOVERY AS A DYNAMIC SERVICE

(71) Applicant: International Business Machines Corporation, Armonk, NY (US)

(72) Inventors: Manish Gupta, New Dehli (IN); Sreekrishnan Venkiteswaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/990,260

(22) Filed: Jan. 7, 2016

(51) Int. Cl.
*G06F 11/00* (2006.01)
*G06F 11/14* (2006.01)
*G06F 11/20* (2006.01)
*H04L 12/24* (2006.01)

(52) U.S. Cl.
CPC ......... *G06F 11/1464* (2013.01); *G06F 11/008* (2013.01); *G06F 11/1451* (2013.01); *G06F 11/1469* (2013.01); *G06F 11/2033* (2013.01); *G06F 11/2069* (2013.01); *H04L 41/5025* (2013.01); *H04L 41/5054* (2013.01); *G06F 2201/805* (2013.01); *G06F 2201/84* (2013.01)

(58) Field of Classification Search
CPC ............. G06F 11/008; G06F 11/2023; G06F 11/1469; G06F 11/2069
See application file for complete search history.

(56) References Cited

U.S. PATENT DOCUMENTS

| | | | |
|---|---|---|---|
| 6,202,071 B1 | 3/2001 | Keene | |
| 6,732,294 B2 | 5/2004 | Mackrory | |
| 7,945,537 B2 | 5/2011 | Balasubramanian | |
| 8,307,239 B1 | 11/2012 | Keith, Jr. | |
| 8,359,491 B1 * | 1/2013 | Bloomstein | G06F 11/1662 714/6.3 |
| 8,762,339 B2 | 6/2014 | Bartholomy | |
| 8,805,967 B2 | 8/2014 | Taylor | |
| 2008/0126279 A1 * | 5/2008 | Keeton | G06F 11/1469 706/19 |
| 2009/0300409 A1 * | 12/2009 | Bates | G06F 11/008 714/5.1 |
| 2012/0084261 A1 | 4/2012 | Parab | |
| 2014/0298018 A1 | 10/2014 | Haggerty et al. | |
| 2014/0298092 A1 | 10/2014 | Boldo et al. | |
| 2014/0310556 A1 | 10/2014 | Agetsuma et al. | |
| 2014/0325256 A1 | 10/2014 | Lambert et al. | |
| 2014/0351644 A1 | 11/2014 | Garg et al. | |
| 2014/0359420 A1 | 12/2014 | Zhu | |
| 2014/0372583 A1 | 12/2014 | Tseng | |
| 2014/0372800 A1 | 12/2014 | Garza et al. | |
| 2015/0019911 A1 | 1/2015 | Boldo et al. | |
| 2015/0026518 A1 | 1/2015 | Wang | |
| 2015/0039930 A1 | 2/2015 | Babashetty et al. | |

(Continued)

OTHER PUBLICATIONS

Wood, Cecchet, Ramakrishnan, Shenoy, Merwe, Venkataramani; "Disaster Recovery as a Cloud Service: Economic Benefits & Deployment Challenges"; Research paper; Jun. 22, 2010; 8 pages; published online.

(Continued)

*Primary Examiner* — Charles Ehne
(74) *Attorney, Agent, or Firm* — Hoffman Warnick LLC

(57) ABSTRACT

A system, method and program product that provides a disaster recovery (DR) brokerage infrastructure. A system is described that includes: a network of intermediate storage nodes and peering points; and a brokerage manager that periodically evaluates a set of DR as a service (DRaaS) providers and selects a cost optimal DRaaS provider for a subscriber, wherein the brokerage manager replicates DR related data for the subscriber in an intermediate storage node prior to delivery to the cost optimal DRaaS provider.

17 Claims, 4 Drawing Sheets

(56) References Cited

U.S. PATENT DOCUMENTS

| | | | |
|---|---|---|---|
| 2015/0052092 A1 | 2/2015 | Tang et al. | |
| 2015/0052324 A1 | 2/2015 | Blea et al. | |
| 2015/0067171 A1 | 3/2015 | Yum et al. | |
| 2015/0067387 A1 | 3/2015 | Liao et al. | |
| 2015/0106885 A1 | 4/2015 | Mukund et al. | |
| 2015/0111532 A1 | 4/2015 | Cai et al. | |
| 2015/0112937 A1 | 4/2015 | Boldo et al. | |
| 2015/0121122 A1 | 4/2015 | Towstopiat et al. | |
| 2015/0134723 A1 | 5/2015 | Kansal et al. | |
| 2015/0142508 A1 | 5/2015 | Buck et al. | |
| 2015/0143161 A1 | 5/2015 | Keith, Jr. | |
| 2015/0143162 A1 | 5/2015 | Wang et al. | |
| 2015/0154084 A1 | 6/2015 | Iwasaki et al. | |
| 2015/0154085 A1 | 6/2015 | Iwasaki et al. | |
| 2015/0161225 A1 | 6/2015 | Braddy | |
| 2015/0169024 A1 | 6/2015 | Jammer | |
| 2015/0169414 A1 | 6/2015 | Lalsangi | |
| 2015/0172101 A1 | 6/2015 | DeCusatis | |
| 2015/0172102 A1 | 6/2015 | DeCusatis | |
| 2015/0172111 A1 | 6/2015 | Lalsangi | |
| 2015/0317194 A1* | 11/2015 | Sampath | G06F 11/008 714/703 |

OTHER PUBLICATIONS

Barker, Colin; "Google Patents Data Centre in a Shipping Container"; Google article; Oct. 11, 2007; 3 pages; published online. http://www.zdnet.com/article/google-patents-data-centre-in-a-shipping-c.

Microsoft Corporation; "Active Directory Disaster Recovery"; White paper; 42 pages; Published by the Microsoft Corporation in Redmond, WA. http://windows.uwaterloo.ca/server/disaster/ms_docs/disaster.htm.

Cloudera.com; "Cloudera Backup and Disaster Recovery"; User Guide; 2014; 1 page; Published by Cloudera online. http://www.cloudera.com/content/www/en-us/documentation/cloudera-...1.

OneCloud Software; "OneCloud Software Announces OneCloud Recovery for Integrating Existing Data Centers with Cloud Resources"; Online Brochure; 2015; 4 pages; published by OneCloud Software online. http://www.onecloudsoftware.com/press/onecloud-software-announces/.

Quantam Corporation; "Reduce Cost & Complexity of Multi-Site Data Protection"; Online Advertisement 2015; 2 pages; Published by Quantam Corporation online. http://www.quantum.com/solutions/usecases/multisite/index.aspx.

VMware, Inc.; "vCloud Air (Formerly vCloud Hybrid Service)"; Online Advertisement; 2015; 5 pages; Published by VMware, Inc. online. http://www.vmware.com/in/products/vcloud-hybrid-service.

Milan New Data Center; "First Class Cloud, Now on the Ground in Italy"; Online Advertisement; date unknown; 2 pages; published by Milan New Data Center online. http://www.softlayer.com/.

Amazon Web Services; "Distaster Recovery"; Online Advertisement; 2015; 5 pages; Published by Amazon Web Services online. http://aws.amazon.com/disaster-recovery/.

Progression Infonet Pvt. Ltd.; "Disaster Recovery as a Service"; Advertisement; date unknown; 5 pages; Published by Progression Infonet Pvt. Ltd. online. https://progression.com/services/cloud/public-cloud/dr-as-a-service/?gcl.

TwinStrata; "EMC CloudArray"; Online Advertisement; 2015; 2 pages; Published by TwinStrata online. http://www.emc.com/domains/cloudarray/index.htm.

Babcock, Charles; "Virtual Server Recovery is now available through IBM's SoftLayer unit; resiliency services to come"; Information Week—Internet News Article; Apr. 16, 2014; 10 pages; Published by Information Week online. http://www.informationweek.com/cloudfinfrastructure-as-a-service/ibm-1.

Rackware; "Amazon Web Services"; Online Advertisement; 2015; 3 pages; published by RACKWARE online. http://www.rackwareinc.com/rackware-management-module-aws/.

Backupreview.com; "Nasuni Receives Patent for Instant Data Recovery and Restore"; online news article; Dec. 16, 2014; 3 pages; published by backupreview.com online. http://www.backupreview.info/2014/12/16/nasuni-receives-patent-for-ins.

Netmagic; "DRaaS—Disaster Recovery as a Service"; Business advertisement; date unknown; 3 pages; published by Netmagic online. http://www.netmagicsolutions.com/draas-disaster-recovery-as-a-service.

VMware, Inc.; "Business Continuity & Disaster Recovery"; Business advertisement; 2015; 4 pages; published by VMware, Inc. online. http://www.vmware.com/business-continuity/disaster-recovery.

Mell, Peter and Grance, Timothy; "The NIST Definition of Cloud Computing"; Special Publication; Sep. 2011; 7 pages; Published by Information Technology Laboratory, Gaithersburg, MD 20899.

* cited by examiner

US 9,430,337 B1

DISASTER RECOVERY AS A DYNAMIC SERVICE

TECHNICAL FIELD

The subject matter of this invention relates to disaster recovery, and more particularly to a system and method of providing disaster recovery as a dynamic service on a network infrastructure such as the cloud.

BACKGROUND

Disaster recovery (DR) is a process by which critical aspects of an entity's information technology (IT) environment is replicated at a remote site. In the event of a failure, a failover procedure takes place that switches IT operations to the remote site to provide operational continuity. Depending on the nature of the operations being performed by the entity, different levels of disaster recovery may be appropriate. For example, critical operations may need to be up and running very quickly, while less critical functions can wait.

Two key metrics for measuring recovery plan requirements include recovery point objective (RPO) and recovery time objective (RTO). RPO is the maximum period in which data might be lost due to an interruption, while RTO is the time and service level within which a business process must be restored. A cost benefit analysis is typically used to determine the aggressiveness of a recovery plan. For example, a business may seek an RPO of 30 minutes and an RTO of 72 hours.

Various network or cloud based DR services are currently available to meet the particular DR requirements of a given entity. However, current DR services are essentially static in nature. In other words, once a DR vendor and plan are selected, there is little or no flexibility to easily change vendors or modify the plan without a significant investment of time and resources. Accordingly, there is no simple mechanism for customers to manage DR costs, easily change RPO/RTO targets, or switch vendors.

SUMMARY

The present disclosure provides a DR service infrastructure in which a brokerage manager dynamically evaluates, selects and changes DR as a service (DRaaS) providers based on a "best fit" approach. In this manner, DR is rendered into a modular, open and redundant platform that loosely couples providers and subscribers. And importantly, the physical distance between the subscriber and the DRaaS provider is no longer a restriction for quality of service (QoS), thereby drastically opening up the DR marketplace for subscribers.

The total cost of ownership (TCO) for DR subscribers is optimized because DR service is transformed into a DR marketplace. The efficiency of the DR marketplace is increased because a subscriber need not be locked into a particular provider. Moreover, benefits of enhanced utilization accrue because the network backbone of the brokerage manager can be shared across subscribers. Further, because the brokerage fabric is "open," advanced services such as DR prediction can be readily integrated.

A first aspect provides a disaster recovery (DR) brokerage infrastructure, comprising: a system that provides access to a network of intermediate storage nodes and peering points; and a brokerage manager that periodically evaluates a set of DR as a service (DRaaS) providers and selects a cost optimal DRaaS provider for a subscriber, wherein the brokerage manager replicates DR related data for the subscriber in a selected intermediate storage node prior to delivery to the cost optimal DRaaS provider.

A second aspect provides a computer program product stored on computer readable storage medium, which when executed by a computer system, provides a disaster recovery (DR) brokerage infrastructure, comprising: programming instructions for managing a network of intermediate storage nodes and peering points; programming instructions that periodically evaluate a set of DR as a service (DRaaS) providers and selects a cost optimal DRaaS provider for a subscriber; and programming instructions that manage replication of DR related data for the subscriber in a selected intermediate storage node prior to delivery to the cost optimal DRaaS provider.

A third aspect provides a method of implementing a disaster recovery (DR) brokerage infrastructure, comprising: providing access to a network of intermediate storage nodes and peering points; periodically evaluating a set of DR as a service (DRaaS) providers and selecting a cost optimal DRaaS provider for a subscriber; and replicating DR related data for the subscriber in a selected intermediate storage node prior to delivery to the cost optimal DRaaS provider.

BRIEF DESCRIPTION OF THE DRAWINGS

These and other features of this invention will be more readily understood from the following detailed description of the various aspects of the invention taken in conjunction with the accompanying drawings in which.

Figure 1:
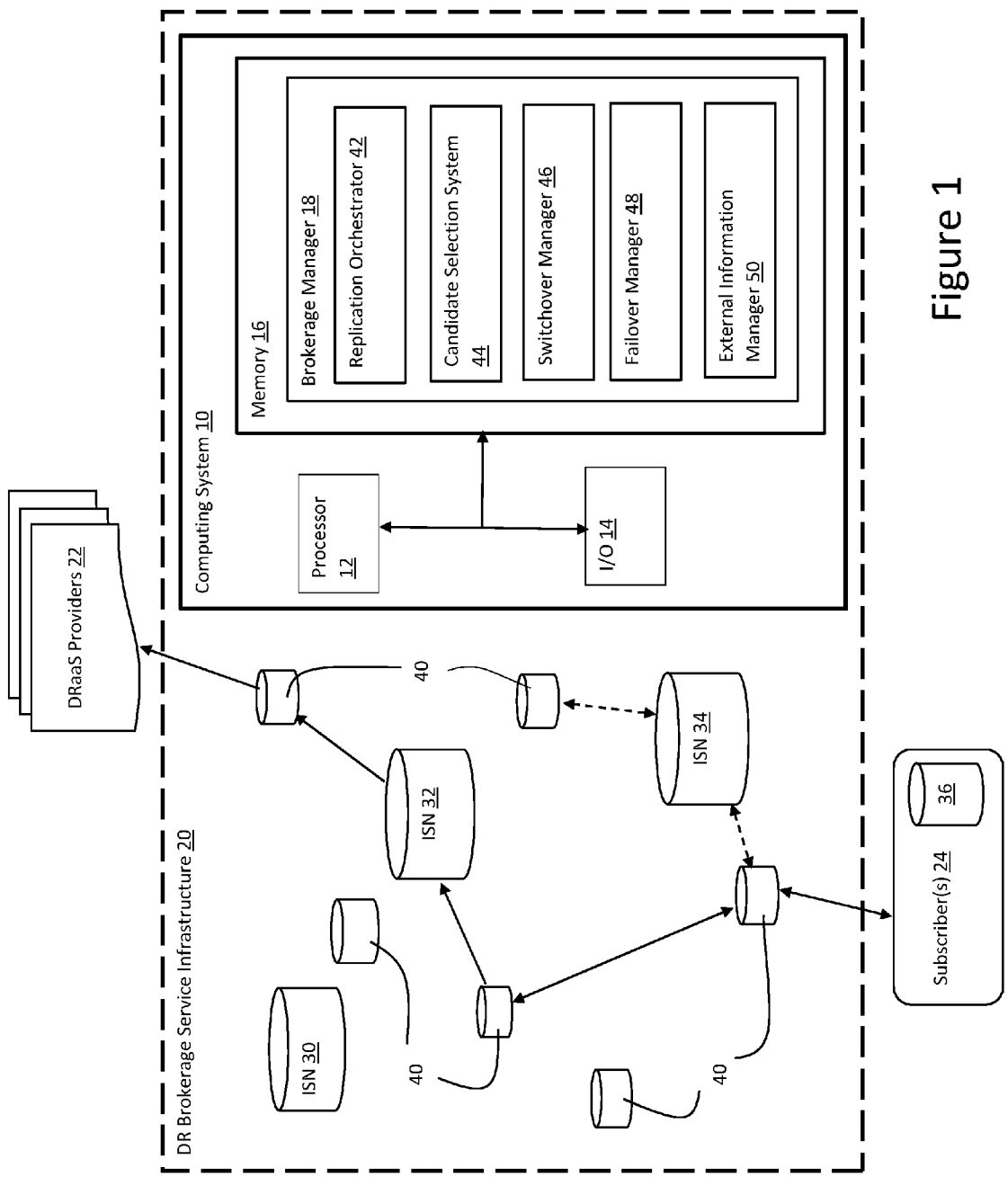
FIG. 1 shows DR brokerage infrastructure according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a DR brokerage service infrastructure 20 that dynamically links subscribers 24 to DR as a service (DRaaS) providers 22. As described in this illustrative embodiment, a brokerage manager 18 dynamically evaluates, selects and changes DRaaS providers 22 for a subscriber 24 based on the most cost optimal solution. For the purposes of this disclosure, the phrase "cost optimal" may be determined based on any assessment, e.g., financial impact, time, quality, prior relationships, etc. Accordingly, rather than contracting directly with a DRaaS provider 22, the subscriber 24 contracts with the DR brokerage service infrastructure 20, which in turn periodically evaluates available DRaaS providers 22 and selects a best fit.

DR brokerage service infrastructure 20 generally includes a network of peering points 40 and intermediate storage nodes (ISNs) 30, 32, 34. Peering points 40 provide access points through which subscribers 24 and DRaaS providers 22 can connect to infrastructure 20 based on geographic proximity. Peering points 40 also may act as switches for relaying data throughout the network. ISNs 30, 32, 34 provide storage systems in which DR related data from a subscriber 24 is temporarily replicated before being loaded to a selected DRaaS provider 22. DR related data generally includes information technology (IT) data and information from the subscriber 24 necessary to implement a DR "failover" in the event that the subscriber's primary IT system fails.

Brokerage manager 18 generally includes: (1) a replication orchestrator 42 for selecting an ISN 30, 32, 34 for the subscriber and scheduling replication of the DR related data therein; (2) a candidate selection system 44 that periodically evaluates the set of DRaaS providers 22 and selects the most cost optimal DRaaS provider; (3) a switchover manager 46 that manages a process of switching to a new DRaaS provider 22 for the subscriber 24; and (4) a failover manager 48 that triggers failover procedures for the subscriber 24 to the selected DRaaS provider 22 in the event of an IT failure. Brokerage manager 18 may also include an external information manager 50 for receiving external cues to assist in failover decision making.

Accordingly, DR brokerage service infrastructure 20 provides a network of peering points 40 that carry DR traffic. The ISNs 30, 32, 34 provide storage systems for replicating DR related data from the subscriber's primary storage 36, either as full replicas or incremental changes. Once DR related data is replicated to an ISN 30, 32, 34, it is then further replicated to the selected DRaaS provider 22. By providing peering points 40 near the subscriber 24, the subscriber need not have close proximity to the DRaaS provider 22 to meet RPO requirements. Furthermore, in situations where both the peering point 40 and selected ISN (e.g., ISN 34) are geographically proximate the subscriber 24, synch-replication of the primary storage may be implemented.

Selection of the ISN 30, 32, 34 may be done in any manner. In one illustrative embodiment, the ISN 30, 32, 34 is selected based on the RPO requirements of the subscriber 24. In the current approach, improved RPO is achieved by coupling the feasible modes of data replication to the distance between the subscriber 24 and the nearest peering point 40, rather than to the distance between the subscriber 24 and the DR failover site (i.e., DRaaS 22). Once selected, the replication orchestrator 42 schedules replication of the data into the selected ISN based on the subscriber requirements.

Candidate selection system 44 evaluates and identifies feasible DRaaS providers 22 based on the constraints of the subscriber's workload, and then chooses a DRaaS provider 22 who is the most cost optimal for the subscriber 24. DRaaS providers 22 may be evaluated periodically for potential switching, e.g., based on a predetermined time period, based on a triggering event such as a user request, based on workload requirements, etc. A switchover is scheduled from the current DRaaS provider 22 to a new DRaaS provider 22 if a more cost optimal solution is available.

Once a decision has been made and scheduled to switch from one DRaaS provider 22 to another, switchover manager 46 operationalizes the process. Timing of the switch may be based on cost variables such as contractual penalties. Switchover manager ensures the continuous, uninterrupted offloading of DR related data from the subscriber 24 to the ISN 32 and then to the new selected DRaaS provider 22. Data migration implemented by the switchover manager 46 may be outsourced to a third party, e.g., when there is a need to switch between DR sites supporting disparate hypervisors or image formats.

The failover manager 48 is responsible for implementing actual failover procedures in the event of an IT failure for a subscriber 24. Failover manager is also responsible for orchestrating subsequent failback procedures to the subscribers system once the failure has been resolved. The candidate selection system 44, switchover manager 46, and failover manager 48 are threaded asynchronously.

The failover manager 48 may base failover decisions from cues received from the external information manager 50. Illustrative cues may include information about impending disasters, social media information, financial crisis information, etc. Furthermore, additional Application Programming Interfaces (APIs) may be provided that subscribers 24 and DRaaS providers 22 can use for programmatic control; and which third party vendors can leverage to provide value-added services.

Figure 2:
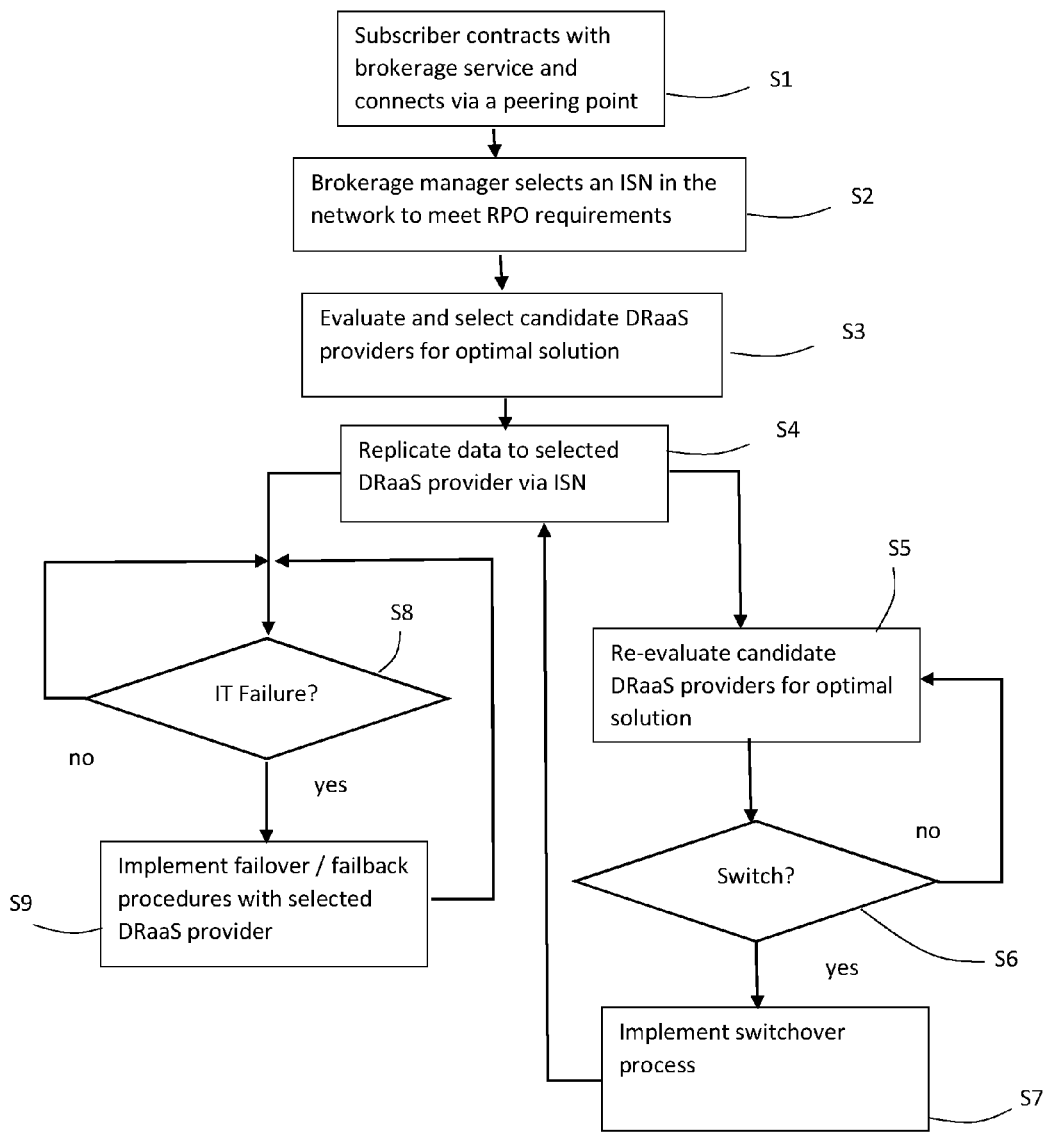
FIG. 2 shows a flow diagram of a method of providing DR brokerage services according to embodiments.

FIG. 2 depicts a flow diagram showing a method of implementing the described brokerage service with reference to FIG. 1. At S1, a new subscriber 24 contracts with the brokerage service and connects to the DR brokerage service infrastructure 20 via a nearest peering point 40. At S2, brokerage manager 18 selects an ISN (e.g., ISN 32) based, e.g., on the specific RPO needs of the subscriber 24. Next at S3, candidate DRaaS providers 22 are evaluated to which one can provide the optimal solution, e.g., which can meet the workload needs of the subscriber and, of those, select one of the DRaaS providers 22 that can provide the most cost optimal solution. At S4, DR related data is replicated to the selected DRaaS provider 22 via the ISN 32.

In a first thread at S8, failover manager 48 determines determines if an IT failure has occurred (or might potentially occur). If an IT failure occurred, failover and failback procedures are implemented with the DRaaS provider for the subscriber 24.

In a second thread, candidate DRaaS providers 22 are re-evaluated to determine which can provide the optimal solution at S5 and at S6 a periodic determination is made whether a switch is warranted. If so, a switchover process is implemented at S7 and replication of data with the newly selected DRaaS provider 24 at S4.

In the case where subscribers have more relaxed RTO requirements, the following may be implemented. Firstly, the ISN 30, 32, 34 may include a primary storage pool to ingest incremental data being replicated from various subscribers 24. The replicated data can then be offloaded to a secondary storage pool loosely coupled to the DR brokerage service infrastructure 20, but spatially proximate the selected DRaaS provider 22. In this approach, the switchover manager does not provide the storage replication as part of the DR plan for the selected DRaaS provider 22. Instead, the failover manager migrates data from the secondary storage pool to the selected DRaaS provider 22 when a failover is triggered.

It is understood that although this disclosure includes a detailed description that may be utilized to provide cloud-based computing services, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 3:
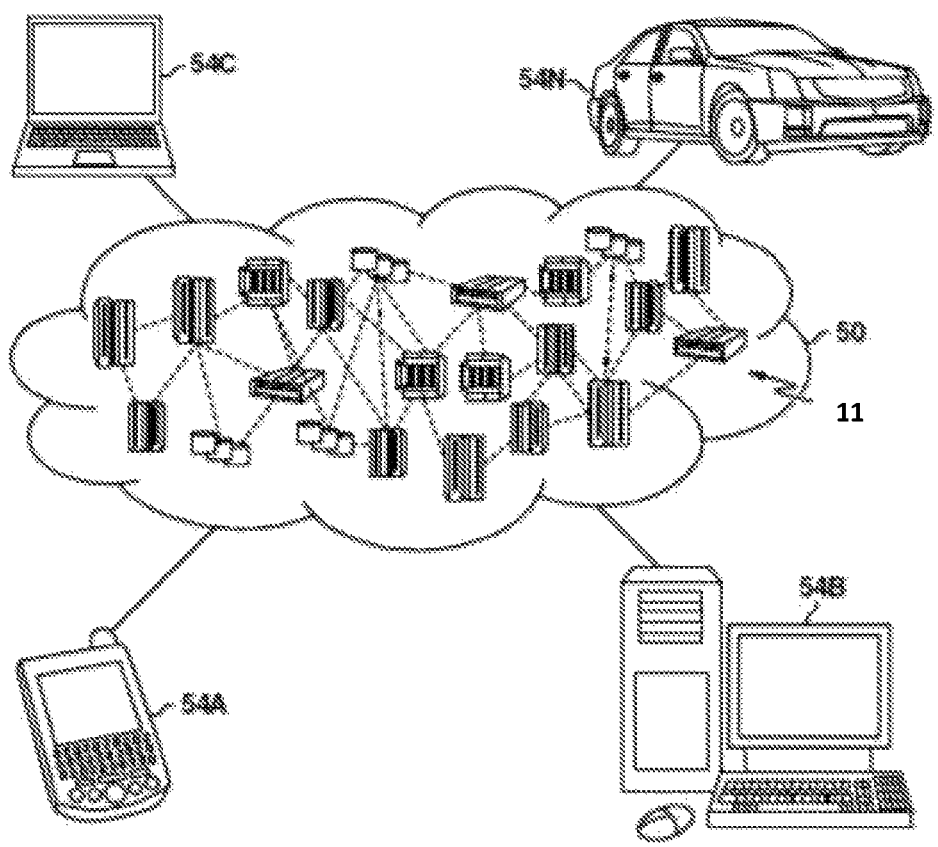
FIG. 3 shows a cloud environment according to embodiments.

A cloud computing environment is service oriented with a focus on statelessness, low coupling, modularity, and semantic interoperability. At the heart of cloud computing is an infrastructure comprising a network of interconnected nodes. Referring now to FIG. 3, illustrative cloud computing environment 50 is depicted. As shown, cloud computing environment 50 comprises one or more cloud computing nodes 11 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 11 and cloud computing environment 50 can communicate with any type of computerized device over any type of network and/or network addressable connection (e.g., using a web browser).

Figure 4:
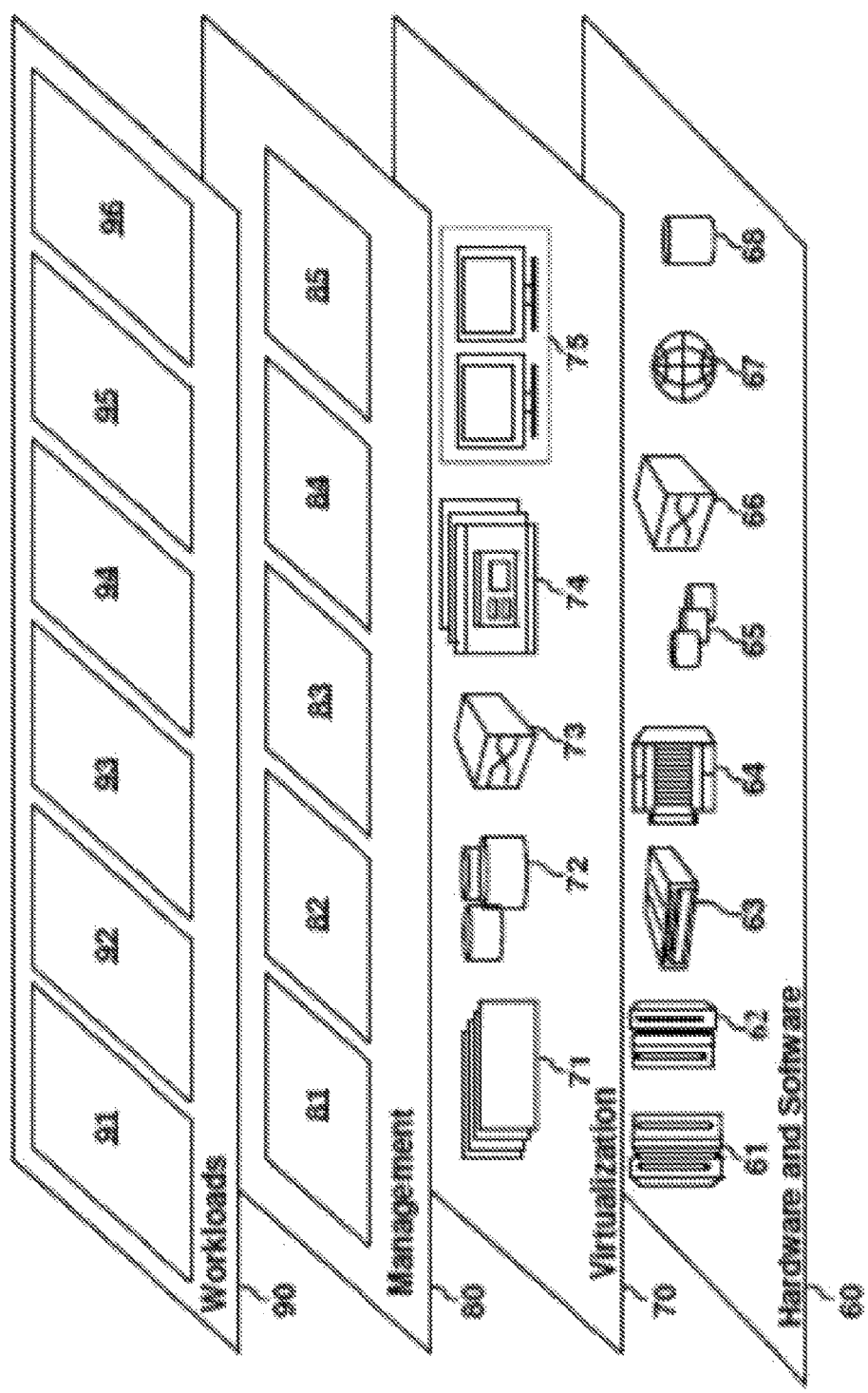
FIG. 4 shows further details of a cloud environment according to embodiments.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in this case DRaaS.

Referring again to FIG. 1, it is understood that brokerage manager 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts an illustrative computing system 10 that may comprise any type of computing device and, and for example includes at least one processor 12, memory 16, an input/output (I/O) 14 (e.g., one or more I/O interfaces and/or devices), and a communications pathway. In general, processor(s) 12 execute program code which is at least partially fixed in memory 16. While executing program code, processor(s) 12 can process data, which can result in reading and/or writing transformed data from/to memory and/or I/O 14 for further processing. The pathway provides a communications link between each of the components in computing system 10. I/O 14 can comprise one or more human I/O devices, which enable a user to interact with computing system 10.

Furthermore, it is understood that the brokerage manager 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will, select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A disaster recovery (DR) brokerage infrastructure, comprising:
    a system that provides access to a network of intermediate storage nodes and peering points; and
    a brokerage manager that periodically evaluates a set of DR as a service (DRaaS) providers and selects a cost optimal DRaaS provider for a subscriber, wherein the brokerage manager replicates DR related data for the subscriber in a selected intermediate storage node prior to delivery to the cost optimal DRaaS provider;
    wherein the brokerage manager includes:
    a replication orchestrator for determining the selected intermediate storage node and scheduling replication of the DR related data therein;
    a candidate selection system that periodically evaluates the set of DRaaS providers and selects the cost optimal DRaaS provider;
    a switchover manager that manages a process of switching to a new DRaaS provider for the subscriber; and
    a failover manager that triggers failover procedures for the subscriber to the selected DRaaS provider in the event of a disaster incident.

2. The DR brokerage infrastructure of claim 1, where the subscriber and set of DRaaS providers access the DR brokerage infrastructure via the peering points.

3. The DR brokerage infrastructure of claim 1, wherein determining the selected intermediate storage node is based on at least one of a recovery point objective (RPO) of the subscriber and a purchased service level of the subscriber.

4. The DR brokerage infrastructure of claim 1, wherein the candidate selection system:
    evaluates the set of DRaaS providers based on workload constraints of the subscriber; and
    schedules a switchover if a more cost optimal DRaas provider is identified.

5. The DR brokerage infrastructure of claim 4, wherein the switchover manager:
    bases timing of a switchover on a set of cost variable associated with the switchover; and
    ensures an uninterrupted flow of DR related data from the subscriber to the intermediate storage nodes and to more cost optimal DRaaS provider.

6. The DR brokerage infrastructure of claim 1, further comprising an external information manager for receiving external cues to assist in failover decision making.

7. A computer program product stored on computer readable storage medium, which when executed by a computer system, provides a disaster recovery (DR) brokerage infrastructure, comprising:
    programming instructions for managing a network of intermediate storage nodes and peering points;
    programming instructions that periodically evaluate a set of DR as a service (DRaaS) providers and selects a cost optimal DRaaS provider for a subscriber;
    programming instructions that manage replication of DR related data for the subscriber in a selected intermediate storage node prior to delivery to the cost optimal DRaaS provider;
    programming instructions for determining the selected intermediate storage node and scheduling replication of the DR related data therein;
    programming instructions that periodically evaluate the set of DRaaS providers and selects the cost optimal DRaaS provider;
    programming instructions that manage a process of switching to a new DRaaS provider for the subscriber; and
    programming instructions that triggers failover procedures for the subscriber to the selected DRaaS provider in the event of a disaster incident.

8. The computer program product of claim 7, where the subscriber and set of DRaaS providers access the DR brokerage infrastructure via the peering points.

9. The computer program product of claim 7, wherein determining the selected intermediate storage node is based on at least one of a recovery point objective (RPO) of the subscriber and a purchased service level of the subscriber.

10. The computer program product of claim 7, wherein selecting a cost optimal DRaaS provider includes:

programming instructions that evaluate the set of DRaaS providers based on workload constraints of the subscriber; and programming instructions that schedule a switchover if a more cost optimal DRaas provider is identified.

11. The computer program product of claim 10, further comprising:

programming instructions that base timing of a switchover on a set of cost variable associated with the switchover; and programming instructions that ensure an uninterrupted flow of DR related data from the subscriber to the intermediate storage nodes and to more cost optimal DRaaS provider.

12. The computer program product of claim 7, further comprising programming instructions for receiving external cues to assist in failover decision making.

13. A method of implementing a disaster recovery (DR) brokerage infrastructure, comprising:

providing access to a network of intermediate storage nodes and peering points;

periodically evaluating a set of DR as a service (DRaaS) providers and selects a cost optimal DRaaS provider for a subscriber;

replicating DR related data for the subscriber in a selected intermediate storage node prior to delivery to the cost optimal DRaaS provider;

determining the selected intermediate storage node and scheduling replication of the DR related data therein;

periodically evaluating the set of DRaaS providers and selecting the cost optimal DRaaS provider;

switching to a new DRaaS provider for the subscriber; and triggering failover procedures for the subscriber to the selected DRaaS provider in the event of a disaster incident.

14. The method of claim 13, wherein determining the selected intermediate storage node is based on at least one of a recovery point objective (RPO) of the subscriber and a purchased service level of the subscriber.

15. The method of claim 13, wherein selecting a DRaaS includes:

evaluating the set of DRaaS providers based on workload constraints of the subscriber; and scheduling a switchover if a more cost optimal DRaas provider is identified.

16. The method of claim 15, wherein:

timing of a switchover is based on a set of cost variable associated with the switchover; and the switchover ensures an uninterrupted flow of DR related data from the subscriber to the intermediate storage nodes and to more cost optimal DRaaS provider.

17. The method of claim 13, further comprising receiving external cues to assist in failover decision making.

* * * * *